US007953076B2

(12) United States Patent
Kim et al.

(10) Patent No.: US 7,953,076 B2
(45) Date of Patent: May 31, 2011

(54) APPARATUS AND METHOD FOR RESERVING SESSION RESOURCE IN IPV4/IPV6 COMBINATION NETWORK

(75) Inventors: Kill-Yeon Kim, Suwon-si (KR); Ji-Young Huh, Yongin-si (KR); Jae-Hwoon Lee, Seoul (KR); Sun-Gi Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1124 days.

(21) Appl. No.: 11/430,843

(22) Filed: May 10, 2006

(65) Prior Publication Data
US 2006/0259641 A1 Nov. 16, 2006

(30) Foreign Application Priority Data
May 11, 2005 (KR) ........................ 10-2005-0039524

(51) Int. Cl.
*H04L 12/28* (2006.01)
(52) U.S. Cl. ....................................... 370/389
(58) Field of Classification Search .................. 370/392, 370/221, 331, 338, 468, 395.1, 389, 410, 370/466
See application file for complete search history.

(56) References Cited

U.S. PATENT DOCUMENTS

| 7,406,031 | B1* | 7/2008 | Swallow ........................ 370/217 |
|---|---|---|---|
| 2002/0015395 | A1 | 2/2002 | Karagiannis |
| 2002/0026525 | A1 | 2/2002 | Armitage |
| 2002/0099854 | A1 | 7/2002 | Jorgensen |
| 2004/0095912 | A1* | 5/2004 | Gao et al. ....................... 370/338 |
| 2004/0133692 | A1 | 7/2004 | Blanchet et al. |
| 2004/0162909 | A1 | 8/2004 | Choe et al. |
| 2004/0264409 | A1* | 12/2004 | Lee et al. ....................... 370/329 |
| 2005/0138166 | A1* | 6/2005 | Blanchet ....................... 709/224 |
| 2005/0182829 | A1* | 8/2005 | King et al. ..................... 709/220 |
| 2006/0104226 | A1* | 5/2006 | Ahn .............................. 370/315 |
| 2006/0126502 | A1* | 6/2006 | Vasseur et al. ................ 370/221 |
| 2006/0133373 | A1* | 6/2006 | Paik et al. ...................... 370/389 |

FOREIGN PATENT DOCUMENTS

| EP | 1 450 544 | 8/2004 |
|---|---|---|
| JP | 2003-018185 | 1/2003 |
| JP | 2006-148902 | 6/2006 |
| WO | WO 03/084185 | 10/2003 |

OTHER PUBLICATIONS

*RFC 2746, RFC 2746—RSVP Operation Over IP Tunnels* by Terzis et al, Network Working Group, Request for Comments 2746, The Internet Society, Jan. 2000; pp. 1-19.

(Continued)

*Primary Examiner* — Man Phan
*Assistant Examiner* — Nourali Mansoury
(74) *Attorney, Agent, or Firm* — H.C. Park & Associates, PLC

(57) ABSTRACT

Provided is a method and apparatus for reserving a session resource in an IPv4/IPv6 combination network system. It allows a node to simultaneously establish an end-to-end session and a tunnel session by notifying a starting node of the tunnel session in advance about whether a last node supports RSVP while assigning IPv4 address information to an IPv6 host according to DSTM upon reserving a resource according to an RSVP mechanism in a 4over6 dual stack transition mechanism (DSTM) environment.

20 Claims, 7 Drawing Sheets

OTHER PUBLICATIONS

*Dual Stack Transition Mechanism*, by Pedro M. Ruiz, et al. Agora Systems S.A., Global IPv6 Summit Madrid Mar. 13-15, 2002, pp. 1-21.

"RSVP-TE-Extension for IPv4/IPv6 Dual Stacking PE Under IPv4 MPLS Core Environment." No. XP-002393605, to Ishii, et al., published on Feb. 21, 2002.

"Connecting IPv6 Islands Across IPv4 Clouds With BGP." No. XP-002393604, to De Clercq, et al., published in Mar. 2003.

Park et al., "An IPv4-to-IPv6 Dural Stack Transition Mechanism supporting Transparent Connections between IPv6 Hosts and IPv4 Hosts in Integrated IPv6/IPv4 Network", IEEE Communication Society 2004, pp. 1024-1027.

Office action from the Japanese Patent Office issued in Applicant's corresponding Korean Patent Application No. 2006-132144 issued on Nov. 25, 2008.

* cited by examiner

FIG. 8

| Type(8) | Length(8) | Code(8) | RSVP(1) | Res(7) |
|---|---|---|---|---|
| Identification(32) | | | | |
| Lifetime(32) | | | | |
| IPv4 Address(32) | | | | |
| IPv6 Address(128) | | | | |

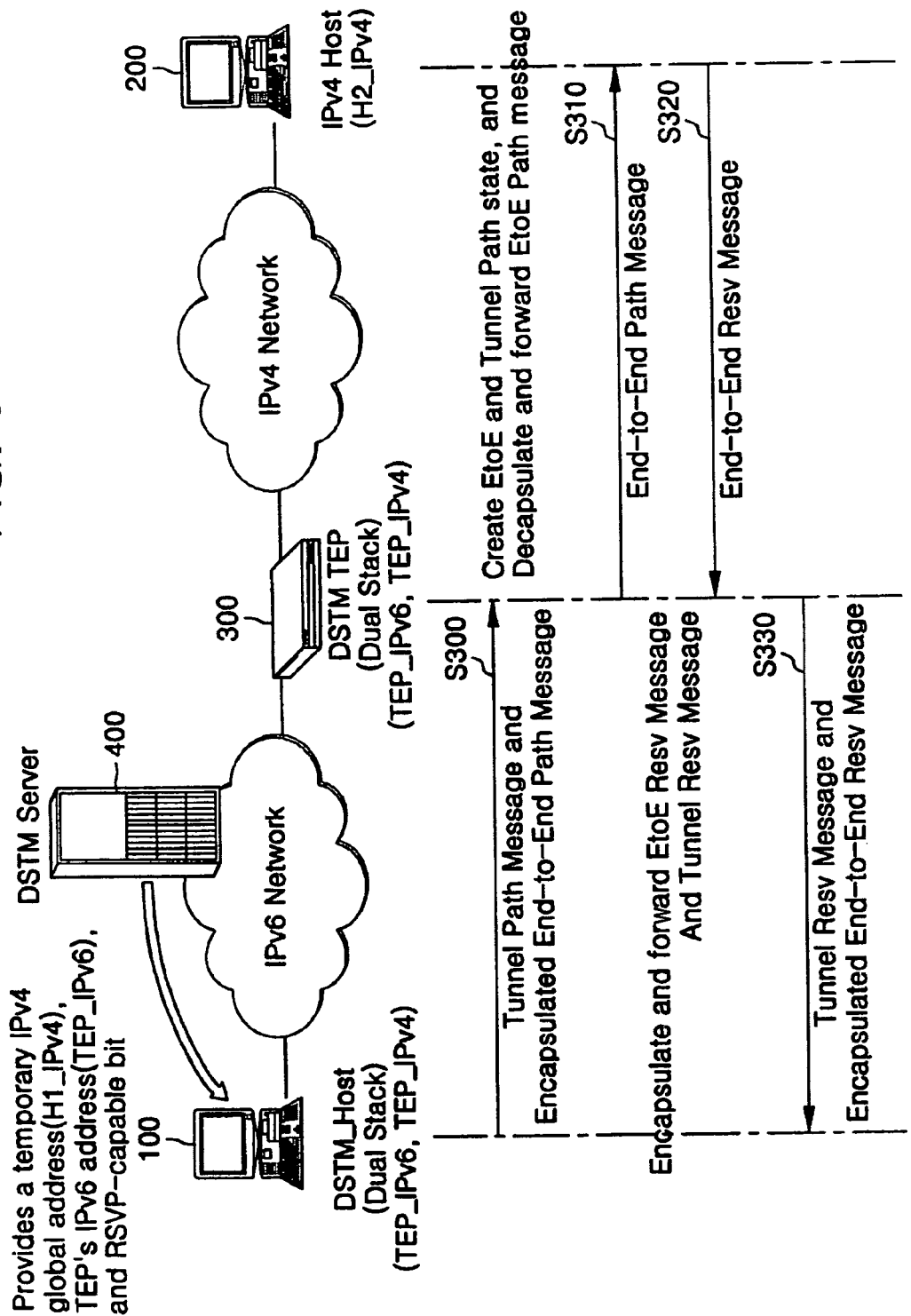

APPARATUS AND METHOD FOR RESERVING SESSION RESOURCE IN IPV4/IPV6 COMBINATION NETWORK

CLAIM OF PRIORITY

This application makes reference to, incorporates the same herein, and claims all benefits accruing under 35 U.S.C. §119 from an application for APPARATUS AND METHOD FOR RESERVING SESSION RESOURCE IN IPv4/IPv6 COMBINATION NETWORK earlier filled in the Korean Intellectual Property Office on May 11, 2005 and there duly assigned Ser. No. 10-2005-39524.

BACKGROUND OF THE INVENTION

1. Field of the Invention

The present invention relates to a method and apparatus for reserving a session resource in an IPv4/IPv6 combination network system, and more particularly, to a method and apparatus for reserving a session resource in an IPv4/IPv6 combination network system that is capable of notifying a starting node of a tunnel session about whether a last node supports RSVP or not while assigning IPv4 address information to an IPv6 host according to a dual stack transition mechanism (DSTM), or Dual IP Layer Stack Transition Mechanism (DSTM), when reserving a resource according to an RSVP mechanism in a 4over6 DSTM environment.

2. Description of the Related Art

The Internet is a core infrastructure of information society. With the development of real-time, high quality service such as voice over IP (VoIP) and Internet TV, most Internet traffic has changed from traffic including text information to multimedia traffic including voice, image, and video information. In addition, traffic has dramatically increased.

The current Internet protocol version 4 (IPv4)-based Internet uses a short address and a complex header structure to accommodate the rapidly increasing number of hosts and multimedia traffic. This degrades the processing speed of a router and a node that process traffic and, in turn, the overall performance of the Internet.

Internet protocol version 6 (IPv6) developed to solve such problems associated with IPv4-based Internet has features such as an expanded 128 bit address system, a simplified header structure, improved quality of service (QoS), and enhanced security.

In reality, the current Internet cannot be completely converted into an IPv6 network within a short period of time since it is widely used as an IPv4 network. The IPv4 network and IPv6 network will coexist for the time being while the IPv4 network is gradually replaced by the IPv6 network.

Coexistence of IPv6 hosts/routers and IPv4 hosts/routers in a current IPv4 network is critical to successfully build the IPv6 network.

Efficient accommodation of rapidly increasing traffic requires an Internet infrastructure capable of providing QoS required for traffic having different features, such as voice, video, and data. It is also necessary to define a model capable of providing QoS for multimedia traffic in an IPv4/IPv6 combination network including both the IPv4 network and the IPv6 network.

Methods for processing packets in such an IPv4/IPv6 combination network including IPv4 hosts and routers and IPv6 hosts and routers have been proposed by the Internet Engineering Task Force (IETF). The methods include a dual stack-based method, a header translation method, and a tunneling method.

In the dual stack based method, all hosts and routers have a dual stack protocol prior to completely shifting to an IPv6 network. That is, the method allows both IPv4 and IPv6 to be used until all systems on the Internet use IPv6.

The header translation method is useful when most systems on the Internet use IPv6 but some still use IPv4. A sender translates a header of an IPv6 packet into an IPv4 header for transmission to a recipient when the recipient does not understand IPv6.

The tunneling method is used when two hosts using IPv6 have to communicate through an IPv4 network. An IPv6 packet is encapsulated in an IPv4 packet upon entrance into an IPv4 area and decapsulated from the IPv4 packet upon exit from the IPv4 region.

Resource reservation protocol (RSVP), a tunneling method for processing packets in the IPv4/IPv6 combination network, is a mechanism that reserves network resources in advance in order to accommodate traffic requiring different QoS in an IP layer.

RSVP may be a flow-based model that allows a user to establish a flow as a kind of virtual line from a source to a destination and to reserve flow-specific resources required by all routers between the source and the destination, thereby guaranteeing QoS.

Here, flow refers to a collection of packets that have the same source and destination address information, the same source and destination port information, and the same session identifier information.

The current RSVP allows the same resource as used for an end-to-end (EtoE) session to be reserved even within the tunnel by dividing an RSVP session for one flow into an end-to-end session and a tunnel session, mapping the two sessions to each other, and separately reserving a resource for each session in order to support end-to-end RSVP on a path including a tunnel.

Among transition mechanisms proposed by IETF Next Generation Transition Working Group (Ngtrans WG), etc., an IPv6 translation mechanism such as network address translation protocol translation (NAT-PT) provides protocol stack translation to enable communication between an IPv6 host and an IPv4 host.

However, because such a translation mechanism translates an IPv6 packet into an IPv4 packet or an IPv4 packet into an IPv6 packet, it is unable to support end-to-end security in a network layer and a transport layer. The translation mechanism is also unable to support perfect translation between the IPv6 header and the IPv4 header.

When an application layer protocol has data containing an IP address, the translation mechanism does not support the translation. To accommodate this application layer protocol, an application layer gateway (ALG) for the application layer protocol is required.

In contrast, a dual stack transition mechanism (DSTM), using a dual stack having both an IPv4 stack and an IPv6 stack as well as tunneling, supports a transparent connection between the dual stack host and the IPv4 host without causing any problem due to protocol translation.

However, the DSTM considers only the initialization of a connection from the dual stack host to the IPv4 host and provides no connection from the IPv4 node to the dual stack host in the IPv6 network.

To solve such problems associated with the original DSTM, a 4over6 DSTM has been proposed. The 4over6 DSTM is able to provide a transparent connection between the IPv4 host and the dual stack host in the IPv6 network even when the IPv4 host establishes the connection to the dual stack host.

Since QoS (Quality of Service) is not considered in the 4over6 DSTM, a tunnel RSVP mechanism capable of reserving resources for end-to-end session, including a tunnel section, is used to provide end-to-end QoS in the 4over6 DSTM environment.

Network Working Group Request for Comments (RFC) 2746 (RSVP Operation Over IP Tunnels) describes an approach for providing RSVP protocol services over IP tunnels. In the RFC 2746, however, there is a limitation that a starting node of the tunnel is only allowed to establish a RSVP session on the tunnel after receiving a reservation (Resv) message containing "NODE_CHAR object" from a last node of the tunnel. This limitation is caused because the starting node of the tunnel cannot be aware of whether the last node supports the tunnel RSVP mechanism.

SUMMARY OF THE INVENTION

Accordingly, the present invention has been made to solve the aforementioned problems. It is an object of the present invention to provide a method and apparatus for reserving a session resource in an IPv4/IPv6 combination network system that allows a tunnel session and an end-to-end session to be simultaneously established by notifying a starting node of a tunnel session about whether a last node supports RSVP or not upon reserving a resource according to an RSVP mechanism in a 4over6 DSTM environment.

According to an aspect of the present invention, there is provided an IPv4/IPv6 combination network system, the system comprising: a dual stack transition mechanism (DSTM) server recognizing whether each host connected to an IPv6 network supports a resource reservation protocol (RSVP) while allocating IPv4 address information to the hosts according to a DSTM, and notifying a node exchanging packets according to the RSVP that each host supports the RSVP upon receipt of a request from the node; and the node checking, through the DSTM server, whether a receiving host supports the RSVP upon receipt of a reservation message according to the RSVP from a transmitting host, and simultaneously establishing an end-to-end session with the receiving host and a tunnel session with the transmitting host mapped to the end-to-end session when the receiving host supports the RSVP.

According to another aspect of the present invention, there is provided an IPv4/IPv6 combination network system reserving a path resource according to a resource reservation protocol (RSVP) mechanism, the system comprising: a first host connected to an IPv6 network and transmitting a path message according to the RSVP to a second host connected to an IPv4 network when the first host needs to transmit packets to the IPv4 network; the second host transmitting a reservation message according to the RSVP to a node located on a boundary between the IPv6 network and the IPv4 network upon receipt of the path message from the first host; a dual stack transition mechanism (DSTM) server recognizing RSVP support information of the first host connected to the IPv6 network while allocating IPv4 address information to the first host according to a DSTM, and providing the RSVP support information of the first host to the node in response to a request from the node; and the node recognizing the RSVP support information of the first host from the DSTM server upon receipt of the reservation message from the second host, and simultaneously establishing an end-to-end session with the second host and a tunnel session with the first host mapped to the end-to-end session according to the RSVP support information of the first host.

According to another aspect of the present invention, there is provided an apparatus for reserving a session resource according to an RSVP mechanism in an IPv4/IPv6 combination network system, the apparatus comprising: a DSTM server for transmitting an allocation message for allocating IPv4 address information to a first host connected to an IPv6 network according to a DSTM and then obtaining RSVP support information from a received allocation reply message, and for providing a update message containing mapping information of the IPv4 address information and the RSVP support information to a node when receiving a request message for requesting the mapping information of the IPv4 address information from the node; the first host for transmitting the allocation reply message containing the RSVP support information to the DSTM server when receiving the allocation message from the DSTM server, and transmitting a packet to the second host belonging to an IPv4 network using the IPv4 address information allocated through the allocation message; the second host for transmitting a packet to the first host using the IPv4 address information allocated to the first host by the DSTM server; and the node for transmitting the request message to the DSTM server to request mapping information of destination address information of the packet that is received from the second host, establishing a session according to the RSVP support information of the first host included in the update message from the DSTM server, and then transmitting the packet to the first host according to the mapping information.

The aparatus may further comprise: a first DNS (domain Name System) server transmitting a query message of a first type for querying the IPv4 address information of the first host from the second host to the DSTM server, and providing the IPv4 address information of the first host to the second host; and a second DNS server providing a reply message containing the IPv4 address information and IPv6 address information of the first host in response to a query message of a second type from the DSTM server.

The DSTM server may comprise: a DNS gateway translating a query message of a first type from the first DNS server into a query message of a second type to transmit the query message of the second type to the second DNS server, and translating a reply message of the second type from the second DNS server into a reply message of the first type to transmit the reply message of the first type to the first DNS server; a DSTM manager allocating the IPv4 address information to the first host, registering the IPv4 address information in the second DNS server, and transmitting an allocation message containing the IPv4 address information to the first host; and a mapping table for storing the mapping information of the first host.

According to still another aspect of the present invention, there is provided a method for reserving a session resource according to an RSVP mechanism in an IPv4/IPv6 combination network including a host, a DSTM server and a node belonging to different networks from each other, the method comprising the steps of: recognizing, by the DSTM server, RSVP support information of a first host and transmitting a update message containing the RSVP support information to the node upon receipt of a request message from the node; transmitting, by the first host, an RSVP dependent path message to a second host; transmitting, by the second host, an RSVP dependent reservation message to the node upon receipt of the path message; and simultaneously transmitting, by the node, to the first host a reservation message for establishing an end-to-end session with the second host and a tunnel reservation message for establishing a tunnel session with the first host according to the RSVP support information of the first host recognized from the update message.

The method may further comprise the steps of: decapsulating, by the node, the encapsulated path message received from the first host to transmit the decapsulated path message to the second host; encapsulating the reservation message received from the second host and simultaneously transmitting to the first host a tunnel reservation message for establishing a tunnel session with the first host and the encapsulated reservation message; and managing end-to-end session information established with the second host and tunnel session information with the first host mapped to the end-to-end session information.

The method may further include the steps of: managing, by the DSTM server, IPv4 address information allocated to the first host and mapping information of the first host; transmitting, by the first host, a packet using each address information allocated through the allocation message; transmitting, by the second host, a packet using the IPv4 address information allocated to the first host; transmitting, by the node, a request message to the DSTM server to request mapping information mapped to destination address information of the packet that is received from the second host; and transmitting, by the DSTM server, to the second host a update message containing the mapping information mapped to the destination address information and the RSVP support information of the first host upon receipt of the request message.

According to yet another aspect of the present invention, there is provided a method for reserving a session resource according to an RSVP mechanism in an IPv4/IPv6 combination network including a host, a DSTM server and a node belonging to different networks from each other, the method comprising the steps of: allocating, by the DSTM server, IPv4 address information to a first host connected to an IPv6 network and recognizing RSVP support information of the first host; transmitting, by the node, a request message to the DSTM server to request mapping information of destination address information of a packet upon receipt of the packet from the second host; transmitting, by the DSTM server, a update message to the node, the update message containing the mapping information responsive to the request message and the RSVP support information of the first host; and simultaneously establishing, by the node, an end-to-end session with the second host and a tunnel session with the first host according to the RSVP support information of the first host that is recognized from the update message.

The step of recognizing the RSVP support information of the first host may comprise the steps of: allocating, by the DSTM server, the IPv4 address information to the first host; transmitting an allocation message to the first host, the allocation message containing the allocated IPv4 address information and IPv6 address information of the node; recognizing, by the first host, each address information from the allocation message and transmitting a reply message containing the RSVP support information to the DSTM server; and recognizing, by the DSTM server, the RSVP support information of the first host that is included in the reply message.

The method may further comprise the steps of: managing, by the DSTM server, the mapping information of the first host in a table; retrieving, by the DSTM server, the mapping information of the first host that is managed in the table and transmitting to the node a update message containing the mapping information and the RSVP support information upon receipt of the request message from the node; and simultaneously transmitting, by the node, to the first host a tunnel reservation message for establishing a tunnel session according to the RSVP support information of the first host and an end-to-end reservation message for establishing an end-to-end session when the node receives an RSVP dependent reservation message from the second host.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 8 illustrates a format of a DSTM message according to an exemplary embodiment of the present invention; and FIG. 9 is a flow diagram illustrating an RSVP mechanism according to an exemplary embodiment of the present invention.

DETAILED DESCRIPTION OF THE EXEMPLARY EMBODIMENTS

Figure 5:
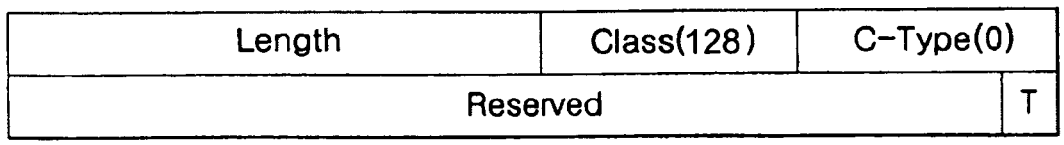
FIG. 5 illustrates a NODE_CHAR object.
Figure 6:
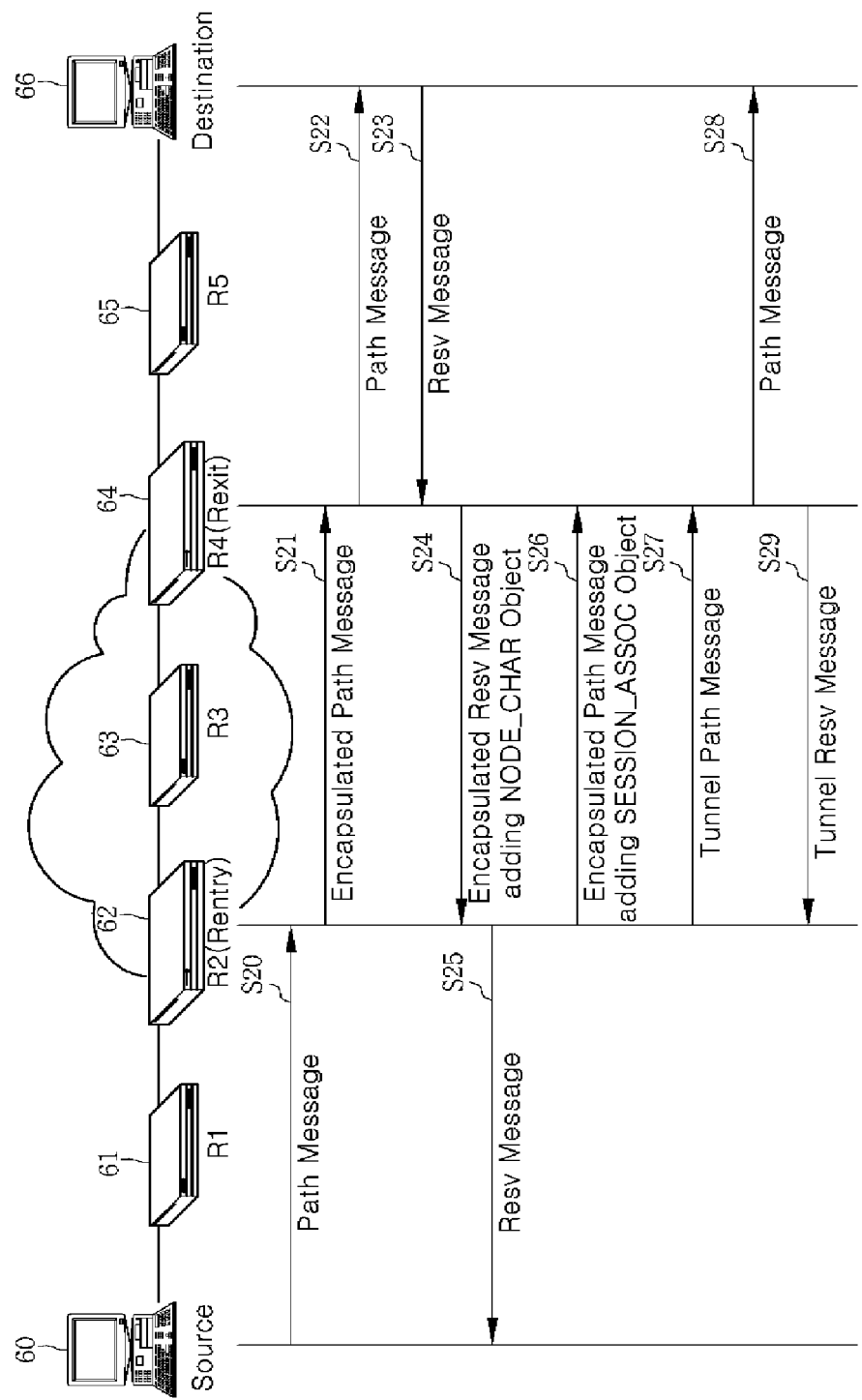
FIG. 6 illustrates a flow of a message according to a RSVP mechanism.
Figure 7:
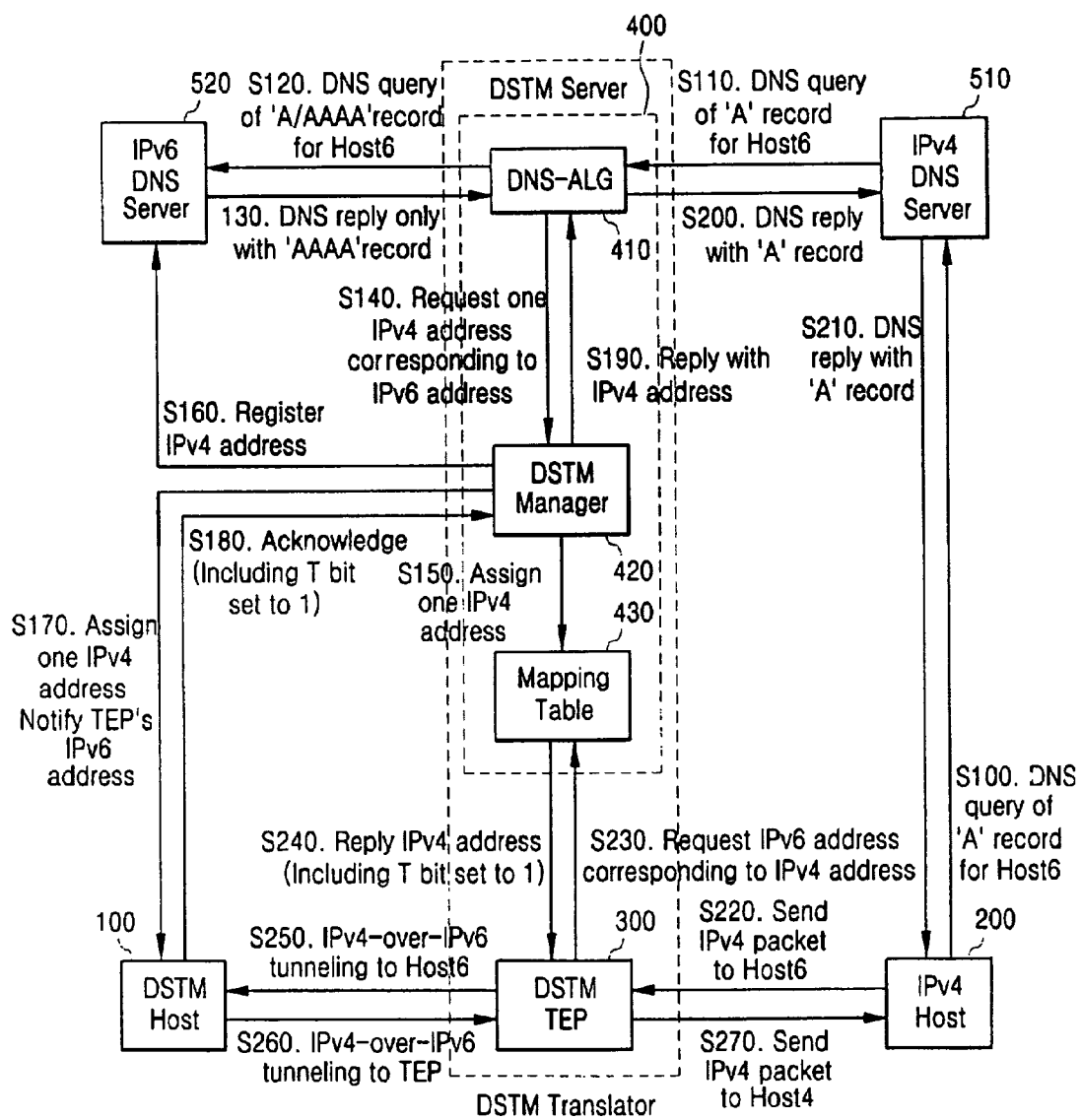
FIG. 7 is a block diagram illustrating a 4over6 DSTM according to an exemplary embodiment of the present invention.

FIGS. 1-6 provide background information for better understanding of the invention depicted in FIGS. 7-9.

Figure 1:
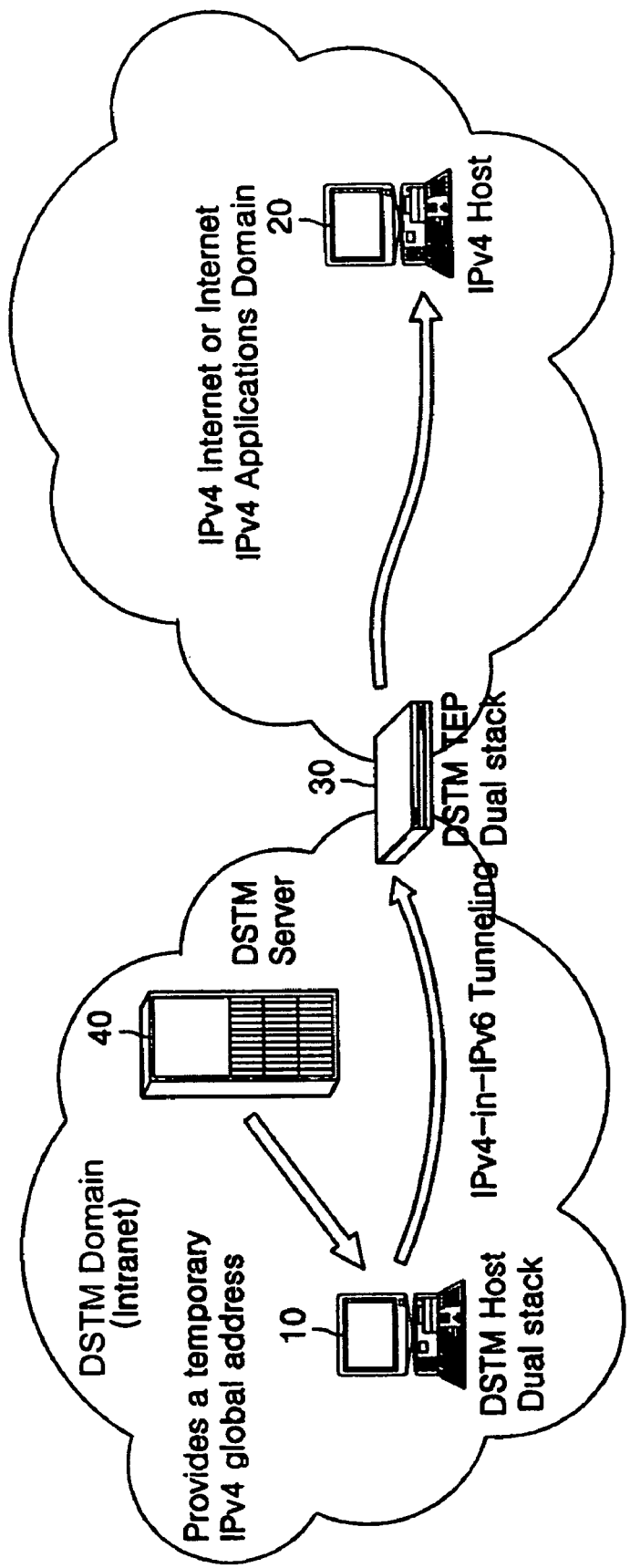
FIG. 1 is a block diagram illustrating a dual stack transition mechanism (DSTM)

FIG. 1 is a block diagram illustrating a dual stack transition mechanism (DSTM).

Referring to FIG. 1, the DSTM allows a dual stack host (DSTM host) 10 present in an IPv6 network to exchange traffic with a host (IPv4 host) 20 present in an external IPv4 network.

The DSTM host 10 and a DSTM server 40 belong to the IPv6 network, the IPv4 host 20 belongs to the IPv4 network, and a DSTM TEP (DSTM tunnel end points) 30 is located between the IPv6 network and the IPv4 network.

When the DSTM host 10 desires to exchange traffic with the IPv4 host 20, it requests the DSTM server 40 to allocate an IPv4 address to be used by the DSTM host 10.

Upon receipt of the request for IPv4 address allocation from the DSTM host 10, the DSTM server 40 sends a temporary IPv4 address and an IPv6 address of the DSTM TEP 30 to the DSTM host 10.

Using the allocated IPv4 address information and the IPv6 address information of the DSTM TEP 30, the DSTM host 10 encapsulates an IPv6 packet into an IPv4 packet for IPv4-over-IPv6 tunneling to the DSTM TEP 30. The DSTM TEP 30 transmits the tunneled IPv4 packet to the IPv4 network.

The DSTM TEP 30 stores mapping information for the IPv4 address information of DSTM host 10 and the IPv6 address information, and tunnels an IPv4 packet from the IPv4 host 20 to the DSTM host 10 according to the mapping information.

In such a DSTM, there is no problem associated with protocol translation like in the NAT-PT (network address translation protocol translation) because the DSTM provides a transparent path between the dual stack host, i.e., DSTM host 10, and the IPv4 host 20 using the tunneling method.

However, the DSTM supports only a connection from the DSTM host 10 in the IPv6 network to the IPv4 host in the IPv4 network, not a connection from the IPv4 host 20 in the IPv4 network to the DSTM host 10 in the IPv6 network.

To solve this problem and provide a transparent connection between the IPv4 host 20 and the DSTM host 10 even when the IPv4 host 20 establishes a connection to the DSTM host 10 in the IPv6 network, the 4over6 (or 4to6) DSTM has been proposed.

Figure 2:
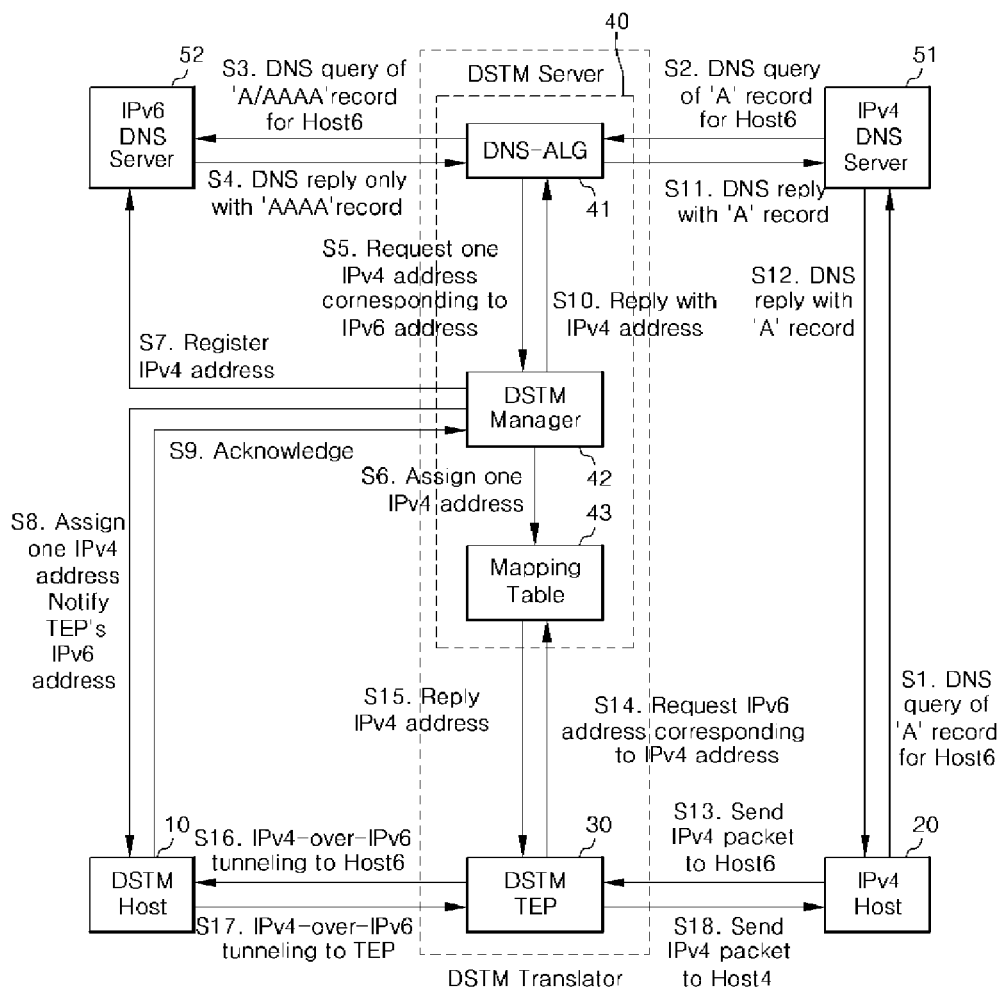
FIG. 2 is a block diagram illustrating a 4over6 DSTM.

FIG. 2 is a block diagram illustrating a 4over6 DSTM.

Referring to FIG. 2, the 4over6 DSTM is composed of a DSTM server 40, a DSTM TEP 30, a DSTM host 10 as a dual stack, and DNS (Domain Name System) servers 51 and 52. The DSTM server 40 is composed of a DNS-ALG (DNS-Application Level Gateway) 41, a DSTM manager 42, and a mapping table 43.

The DSTM server 40 allocates a temporary IPv4 address to the DSTM host 10 and manages mapping information for the allocated IPv4 address and the IPv6 address of the DSTM host in the mapping table 43.

The DSTM TEP 30 is located between the IPv6 network and the IPv4 network for tunneling packets to the DSTM host 10 or transmitting packets to the IPv4 host 20.

Upon receipt of a DNS query message, the DNS servers 51 and 52 provide a DNS reply message containing IP address information.

To connect and transmit packets to the DSTM host 10 belonging to the IPv6 network, the IPv4 host 20 needs the IPv4 address of the DSTM host 10. In general, the IPv4 host 20 sends an A-type DNS query message (A refers to the DNS record type for the IPv4 address) to the IPv4 DNS server 51 in the IPv4 network in order to obtain the IPv4 address of the DSTM host 10 (S1).

Because the IPv4 DNS server 51 does not store the DNS information of the DSTM host 10, the IPv4 DNS server 51 transmits the DNS query message toward the IPv6 DNS server 52 in the IPv6 network managing the IPv4 address of the DSTM host 10 (S2).

The DNS query message is received by a gateway router, i.e., DSTM TEP 30, between the IPv6 network and the IPv4 network. The DSTM TEP 30 sends the DNS query message to the DSTM server 40 since a destination address of the received DNS query message is an address of the DSTM server 40.

The DNS-ALG 41 of the DSTM server 40 translates the received A-type DNS query message into an AAAA-type DNS query message (AAAA refers to DNS record type for the IPv6 address) requesting both the IPv4 address information and the IPv6 address information, and sends the DNS query message to the IPv6 DNS server 52 (S3).

When the DSTM server 40 receives a AAAA-type DNS reply message containing both the IPv4 address and the IPv6 address information of the DSTM host 10 from the IPv6 DNS server 52 (S4), the DNS-ALG 41 of the DSTM server 40 translates the AAAA-type DNS reply message into an A-type DNS reply message containing only the IPv4 address. The DNS-ALG 41 sends the A-type DNS reply message to the IPv4 DNS server 51.

If the received AAAA-type DNS reply message contains only the IPv6 address information, the DNS-ALG 41 requests the DSTM manager 42 to assign a temporary IPv4 address (S5).

The DSTM manager 42 allocates a temporary IPv4 address from its IPv4 address pool to the DSTM host 10 (S6).

The DSTM manager 42 stores the IPv6 address and the allocated temporary IPv4 address of the DSTM host 10, and mapping information such as lifetime information indicating a period of time for which the allocated temporary IPv4 address is valid, in the mapping table 43, and sets a timer with the lifetime information.

The DSTM manager 42 dynamically registers the allocated temporary IPv4 address in the IPv6 DNS server 52 (S7).

The DSTM manager 42 provides the allocated temporary IPv4 address information, the IPv6 address information of the DSTM TEP 30, and the lifetime information to be used for tunneling, by transmitting a DSTM address allocation message to the DSTM host 10 (S8).

Upon receipt of the DSTM address allocation message from the DSTM manager 42, the DSTM host 10 stores the IPv4 address information and the IPv6 address information of the DSTM TEP 30 in a cache and sets a timer with the lifetime information.

The DSTM host 10 also transmits a DSTM address allocation acknowledgment message to the DSTM manager 42 of the DSTM server 40 to notify that the address allocation is successful (S9).

Upon receipt of the DSTM address allocation acknowledgment message from the DSTM host 10, the DSTM manager 42 transmits the IPv4 address allocated to the DSTM host 10 to the DNS-ALG 41 (S10).

The DNS-ALG 41 sends the A-type DNS reply message containing the IPv4 address information received from the DSTM manager 42 to the IPv4 DNS server 51 (S11), and the IPv4 DNS server 51 sends the DNS reply message to the IPv4 host 20 (S12).

The IPv4 host 20 then transmits an IPv4 packet to the DSTM host 10 using the IPv4 address information of the DSTM host 10 obtained from the received DNS reply message (S13). The DSTM TEP 30 utilizes IPv4-over-IPv6 tunneling to send the IPv4 packet from the IPv4 host 20 to the DSTM host 10.

If an IPv6 destination address of the received IPv4 packet is not found from the IPv4 packet, the DSTM TEP 30 sends a DSTM binding request message to the DSTM server 40 to request an IPv6 address mapped to the destination address of the IPv4 packet (S14).

Upon receipt of the DSTM binding request message from the DSTM TEP 30, the DSTM server 40 retrieves mapping information mapped to the IPv4 address, i.e., the IPv6 address and lifetime information, from the mapping table 43 and sends the mapping information to the DSTM TEP 30 via a DSTM binding update message (S15).

When the DSTM TEP 30 receives the DSTM binding update message from the DSTM server 40, the DSTM TEP 30 stores the IPv6 address information and lifetime information mapped to the IPv4 address information of the DSTM host 10 in a mapping table of the DSTM TEP 30 and sets a timer with the lifetime information.

The DSTM TEP 30 performs IPv4-over-IPv6 tunneling of the received IPv4 packet from the IPv4 host 20 to the DSTM host 10 using the stored mapping information (S16).

When the DSTM host 10 receives the tunneled packet from the DSTM TEP 30, the DSTM host 10 obtains, by decapsulation, the original IPv4 packet transmitted by the IPv4 host.

The DSTM host 10 performs IPv4-over-IPv6 tunneling of the IPv4 packet to the DSTM TEP 30 using the IPv4 address allocated by the DSTM server 40 and the IPv6 address of the DSTM TEP 30 (S17). The DSTM TEP 30 decapsulates the received IPv4 packet and transmits it to the IPv4 network (S18).

When the timer set with an entry of the mapping table 43 (i.e., lifetime of the IPv4 address that has been allocated to the DSTM host 10) expires, the DSTM manager 42 deletes the entry from the mapping table 43, requests to delete the IPv4 address information of the DSTM host 10 registered upon IPv4 address allocation from the IPv6 DNS server 52, and withdraws the IPv4 address allocated to the DSTM host 10.

To continue to use the allocated IPv4 address after the lifetime expires, the DSTM host 10 sends a DSTM address extension request message to the DSTM server 40 prior to expiration of the lifetime to extend the lifetime of the allocated IPv4 address.

When the DSTM server 40 receives the DSTM address extension request message from the DSTM host 10, it retrieves a relevant entry from the mapping table 43 to extend the lifetime and reset a relevant timer.

The DSTM server 40 also sends a DSTM address extension reply message to the DSTM host 10. The DSTM TEP 30 deletes each entry from its mapping table when mapping information is not used until the timer set to the entry of the mapping table expires.

When the mapping information is used prior to timer expiration, the DSTM TEP 30 sends a DSTM binding request message to the DSTM server 40 prior to the timer expiration to update the mapping information and reset the timer.

The 4over6 DSTM defines the DSTM message (DSTM address allocation message and DSTM address allocation acknowledgement message) for IPv4 address allocation between the DSTM server 40 and the DSTM host 10, and the DSTM message (DSTM binding update message and DSTM binding request message) for binding information update between the DSTM server 40 and the DSTM TEP 30.

Figure 3:
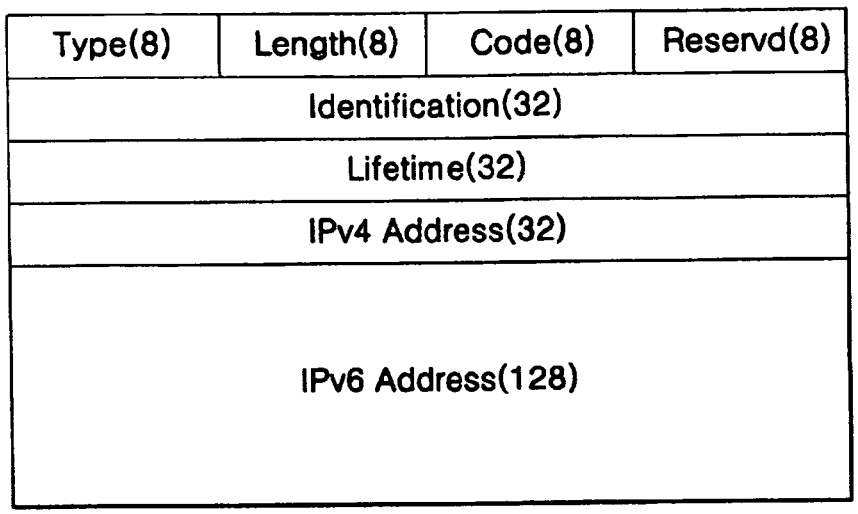
FIG. 3 illustrates a format of a DSTM message defined by a 4over6 DSTM.

FIG. 3 illustrates a format of a DSTM message defined by a 4over6 DSTM.

Referring to FIG. 3, a DSTM message contains a type field, a length field, a code field, an 8-bit reserved field, an identification field, a lifetime field, an IPv4 address field, and an IPv6 address field.

The type field indicates the type of the DSTM message, and the length field indicates the length of the DSTM message in bytes.

The code field indicates a result of processing the DSTM message, and the identification field indicates identification for matching a DSTM request message to a reply message.

The lifetime field indicates a period of time for which information in the IPv4 address field and the IPv6 address field is valid, the IPv4 address field indicates an IPv4 address of the DSTM host 10, and the IPv6 address field indicates an IPv6 address of the DSTM host 10 or an IPv6 address of the DSTM TEP 30.

Meanwhile, a resource reservation protocol (RSVP) mechanism is designed for reserving an end-to-end (EtoE) resource in an integrated service (IntServ) model proposed to provide quality of service (QoS) required by a specific application flow.

In order to reserve a resource for a unicast or multicast data flow, the RSVP defines a session for each data flow by selectively using a destination IP address, transport layer protocol, and destination port information, and defines a sub-flow of each session by selectively using a source address and source port information.

A packet transmitting endpoint initializes the session and the sub-flow and then transmits a path message to establish a resource reservation path to a receiving endpoint.

The path message contains a "SESSION Object" carrying session information, a "RSVP_HOP object" carrying an IP address of an interface, "Sender_Templeate" defining a sub-flow, "Sender Tspec" defining a traffic property of the flow.

Since the path message, containing "Route Alert IP Option," is directed to the receiving endpoint, a node supporting RSVP on the path processes the path message.

If an error occurs in path establishment, the node on the path deletes the path message and sends a path error (PathErr) message reporting the error to a previous node. If no error occurs, the node establishes a path for the flow and transmits the message to a subsequent node.

When the path message reaches the receiving endpoint, the receiving endpoint establishes the flow path and then transmits a reservation (Resv) message according to set path information in a hop-by-hop manner to require a resource for desired QoS.

The Resv message, containing "SESSION object", "RSVP_HOP object", "flow spec" defining desired QoS, "filter spec" identifying a sub-flow, is sent to the transmitting endpoint in a hop-by-hop manner. Upon receipt of the Resv message, nodes on the path supporting RSVP reserve resources for the flow.

The node sends the Resv message to a next node via the path established by the path message when the resource reservation request is accepted, and sends a reservation error (ResvErr) message reporting failure of the resource reservation request to the receiving endpoint when the resource reservation request is refused.

At present, the "RFC 2746" defines a mechanism for supporting end-to-end RSVP on a path including a tunnel. The basic principle of the mechanism is repeated transmission of the RSVP message. That is, the mechanism is to perform path establishment and resource reservation for the tunnel section by separately transmitting an RSVP message for the tunnel section as well as the end-to-end RSVP message, and perform resource reservation between an endpoint and an endpoint including the tunnel by mapping resource reservation set in the tunnel section to resource reservation set outside of the tunnel section.

The end-to-end RSVP message is transmitted in the same manner as an existing RSVP message, in an IP encapsulated form, in the tunnel section like a data packet so that resource reservation between the two end endpoints excluding the tunnel section is set. Within the tunnel, the starting node and the last node of the tunnel perform path establishment and resource reservation for the tunnel by separately transmitting a tunnel RSVP message for a tunnel session.

The tunnel session and the end-to-end session are mapped to each other using the "SESSION_ASSOC object" defined in the "RFC 2746" such that the RSVP between the two endpoints including the tunnel is transparent and consistent. The "RFC 2746" defines "NODE_CHAR object," in addition to "SESSION_ASSOC object."

The "NODE_CHAR object" is defined to deliver information as to whether the last node of the tunnel section supports the tunnel RSVP mechanism to the starting node of the tunnel section.

Figure 4:
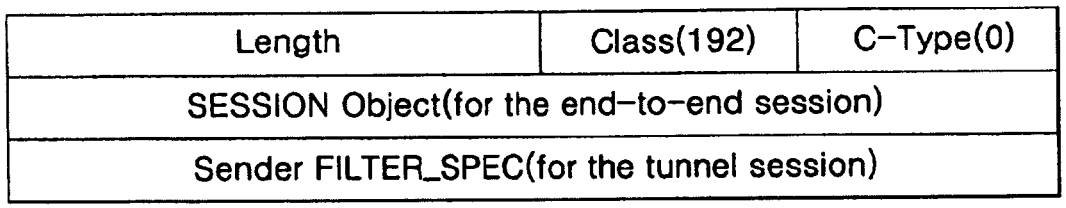
FIG. 4 illustrates a SESSION_ASSOC object.

FIG. 4 illustrates a SESSION_ASSOC object, and FIG. 5 illustrates a NODE_CHAR object.

Referring to FIG. 4, the "SESSION_ASSOC object" for defining mapping between a tunnel session and an end-to-end session includes "SESSION object" of the end-to-end session and "Sender FILTER_SPEC" information of the tunnel session. If the last node of the tunnel supports the tunnel RSVP mechanism, the starting node of the tunnel includes the "SESSION_ASSOC object" in the path message and tunnels the resultant message to the last node of the tunnel. The Length field contains the size of the SESSION_ASSOC object in bytes, the Class should be 192 and the C-type should be sent as zero and ignored on receipt.

Referring to FIG. 5, the "NODE_CHAR object" for delivering the information on whether the last node of the tunnel section supports the tunnel RSVP mechanism to the starting node of the tunnel section is set with "T" bits. When the last node of the tunnel section supports the tunnel RSVP mechanism, the NODE_CHAR object is added to the Resv message and tunneled to the starting node of the tunnel section. The Length field contains the size of the NODE_CHAR object in bytes, the Class is proposed to be set at 128, the C-type should be sent as zero and ignored on receipt, and the T bit shows that the node is a RSVP-tunnel capable node.

FIG. 6 illustrates a message flow according to a RSVP mechanism.

Referring to FIG. 6, a transmitting endpoint (source) 60 transmits a path message for reserving a resource for packet transmission, to a receiving endpoint (destination) 66 in a hop-by-hop manner. Upon receipt of the path message, the receiving endpoint 66 sends a reservation (Resv) message to the transmitting endpoint 60 in a hop-by-hop manner to reserve the resource. Nodes 61 to 65 located between the transmitting endpoint 60 and the receiving endpoint 66 reserve the resource in response to the Resv message to thereby establish a session. The starting node of the tunnel session is Rentry 62 and the last node is Rexit 64.

When the transmitting endpoint (source) 60 sends the path message to the receiving endpoint 66 to reserve a session resource for packet transmission (S20), the starting node of the tunnel section, Rentry 62, encapsulates and sends the path message to the last node of the tunnel, Rexit 64, since Rentry 62 has no information on whether Rexit 64 supports the tunnel RSVP mechanism (S21).

The path message is processed by each of the nodes 62 to 65, which support RSVP on the path between the transmitting endpoint 60 and the receiving endpoint 66, because the path message contains a "router alert IP option."

Upon receipt of the encapsulated path message, Rexit 64 decapsulates and transmits it to the receiving endpoint 66 (S22).

When the receiving endpoint 66 receives the path message, it sends a reservation (Resv) message to the transmitting endpoint 60 in a hop-by-hop manner to request resource reservation on the end-to-end path (S23).

Upon receipt of the Resv message, the Rexit 64 adds a "NODE_CHAR object" having "T" set bits to the Resv message, encapsulates the resultant message, and tunnels the encapsulated message to the Rentry 62, when the Rexit 64 supports the tunnel RSVP mechanism (S24).

The Rentry 62 decapsulates the received Resv message, deletes "NODE_CHAR object", and transmits the resultant Resv message to the transmitting endpoint 60 (S25).

The Rentry 62 also initializes the tunnel session corresponding to the end-to-end session, includes "SESSION_ASSOC object" carrying mapping information for the end-to-end session and the tunnel session in the path message, and tunnels the resultant message to the Rexit 64 (S26).

Further, the Rentry 62 transmits a tunnel path message to the Rexit 64 to establish the tunnel session path (S27).

When the Rexit 64 receives the path message having the "SESSION_ASSOC object" containing the tunnel session information corresponding to the end-to-end session, it decapsulates the path message, removes the "SESSION_ASSOC object", and transmits the resultant path message to the receiving endpoint 66 (S28).

The Rexit 64 initializes the tunnel session corresponding to the end-to-end session using the mapping information included in the "SESSION_ASSOC object." Upon receipt of the tunnel path message, the Rexit 64 establishes the tunnel session path and then transmits a tunnel Resv message to the Rentry 62 to request the resource reservation for the tunnel section (S29).

However, the RSVP-on-tunnel support mechanism currently defined in the "RFC 2746" transmits the tunnel RSVP message to allow the endpoints of the tunnel section, i.e., the starting node and the last node of the tunnel section, to reserve resources in the tunnel section instead of the end-to-end hosts, and supports the end-to-end RSVP on the path including the tunnel by mapping the end-to-end session to the tunnel session.

Thus, in the RSVP mechanism, the tunnel session is not established together with the end-to-end session but after a first Resv message is transmitted to the starting node of the tunnel.

Hereinafter, a method and apparatus for reserving a session resource in an IPv4/IPv6 combination network system according to the present invention will be described in detail with reference to the accompanying drawings.

FIG. 7 is a block diagram illustrating a 4over6 DSTM according to an exemplary embodiment of the present invention.

Referring to FIG. 7, a 4over6 DSTM according to an embodiment of the present invention is composed of a DSTM server 400, a DSTM host (first host) 100 as a dual stack, and an IPv6 domain name system (DNS) server 520, all of them belonging to an IPv6 network; an IPv4 host (second host) 200 and IPv4 DNS server 510, both belonging to an IPv4 network; and a DSTM TEP (node) 300 between the IPv4 network and the IPv6 network.

When the DSTM server 400 receives an address allocation request message from the DSTM host 100, the DSTM server 400 allocates a temporary IPv4 address to the DSTM host 100, manages mapping information for the allocated IPv4 address and an IPv6 address of the DSTM host 100 in a mapping table 430, and sends to the DSTM host 100 an address allocation reply message containing RSVP support information of a last node of a tunnel session, i.e., a DSTM TEP 300, the allocated IPv4 address, and an IPv6 address of the DSTM TEP 300.

If the DSTM server 400 receives a DSTM binding request message requesting the IPv6 address mapped to a destination address of an IPv4 packet received from the DSTM TEP 300, the DSTM server 400 retrieves mapping information mapped to the IPv4 address from the mapping table 430 and transmits a DSTM binding update message containing RSVP support information of the DSTM host 100 and the mapping information to the DSTM TEP 300.

The DSTM TEP 300 is located between the IPv6 network and the IPv4 network for tunneling an IPv4 packet to the DSTM host 100.

When the tunnel session is established according to a tunnel RSVP mechanism, the DSTM TEP 300 corresponds to the starting node of the tunnel session and the DSTM host 100 corresponds to the last node of the tunnel session.

To connect to the DSTM host 100 belonging to the IPv6 network, the IPv4 host 200 sends to the IPv4 DNS server 510 a DNS query message of A type (A refers to a DNS record type for the IPv4 address) to query the IPv4 address of the DSTM host 100 (S100).

Upon receipt of the DNS query message, the IPv4 DNS server 510 sends the DNS query message toward the IPv6 DNS server 520 of the IPv6 network managing address information of the DSTM host 100 (S110).

The DNS query message is sent to the gateway, i.e., DSTM TEP 300, present between the IPv6 network and the IPv4 network. Because the destination address of the received DNS query message is an address of the DSTM server 400, the DSTM TEP 300 transmits the DNS query message to the DSTM server 400.

In the DSTM server 400, the DNS-ALG 410 translates the received DNS query message of the A type into a DNS query message of an AAAA type (AAAA refers to a DNS record type of IPv6 address) requesting both the IPv4 address and the IPv6 address and transmits the DNS query message of the AAAA type to the IPv6 DNS server 520 (S120).

Upon receipt of the DNS query message, the IPv6 DNS server 520 sends to the DSTM server 400 a DNS reply message containing the IPv4 address and the IPv6 address of the DSTM host 100 (S130).

When the DSTM server 400 receives the AAAA-type DNS reply message containing both the IPv4 address and the IPv6 address of the DSTM host 100 from the IPv6 DNS server 520, the DNS-ALG 410 translates the AAAA-type DNS reply message into a A-type DNS reply message containing only the IPv4 address.

The DSTM server 400 sends the A-type DNS reply message to the IPv4 DNS server 510 (S200).

If the DSTM server 400 receives the DNS reply message containing only the IPv6 address, i.e., the AAAA-type DNS reply message containing only the IPv6 address of the DSTM host 100 from the IPv6 DNS server 520, the DSTM server 400 allocates one of temporary IPv4 address information from an IPv4 address pool to the DSTM host 100.

If the DNS-ALG 410 receives the DNS reply message containing only the IPv6 address, the DNS-ALG 410 request the DSTM manager 420 to assign the IPv4 address to the DSTM host 100 (S140).

The DSTM manager 420 allocates a temporary IPv4 address to the DSTM host 100 (S150), stores mapping information such as the IPv6 address and the allocated IPv4 address of the DSTM host 100, lifetime information indicating a period of time in which the allocated IPv4 address is valid, and the like in the mapping table 430, and sets the lifetime information to a timer.

The DSTM manager 420 dynamically registers the allocated IPv4 address in the IPv6 DNS server 520 (S160).

The DSTM manager 420 sends to the DSTM host 100 a DSTM address allocation message containing the allocated IPv4 address, the IPv6 address of the DSTM TEP 300 to be used for tunneling, and lifetime information of the allocated IPv4 address (S170).

Upon receipt of the DSTM address allocation message from the DSTM manager 420, the DSTM host 100 stores the allocated IPv4 address and the IPv6 address of the DSTM TEP 300 in a cache and sets the lifetime information to a timer.

The DSTM host 100 stores the IPv4 address information and the IPv6 address information of the DSTM TEP 300 in a cache and sends the DSTM address allocation acknowledgement message containing the RSVP support information to the DSTM server 400 to notify that the address allocation is successful and whether the DSTM host 100 supports RSVP (S180).

That is, if the DSTM host 100 supports the RSVP mechanism, the DSTM host 100 includes the RSVP support information into the DSTM address allocation acknowledgement message and transmits the resultant message to the DSTM server 400.

FIG. 8 illustrates a format of a DSTM message according to an exemplary embodiment of the present invention.

Referring to FIG. 8, the DSTM message according to an embodiment of the present invention contains a type field indicating the type of the DSTM message, a length field indicating the length of the message in byte, a code field indicating a result of processing the DSTM message, an RSVP field indicating RSVP support information, a 7-bit reserved field, an identification field for matching a DSTM request message to a reply message, a lifetime field, an IPv4 address field and an IPv6 address field.

Preferably, the RSVP field uses a one-byte field of the 8-bit reserved field of FIG. 3 leaving a 7-bit reserved field.

Referring again to FIG. 7, upon receipt of the DSTM address allocation acknowledgement message from the DSTM host 100, the DSTM manager 420 notifies the DNS-ALG 410 of the IPv4 address allocated to the DSTM host 100 (S190). The DNS-ALG 410 sends a DNS reply message of an A type containing the IPv4 address to the IPv4 DNS server 510 (S200).

The IPv4 DNS server 510 sends the received DNS reply message to the IPv4 host 200 to notify the allocated IPv4 address of the IPv6 host 100 (S210).

The IPv4 host 200 sends an IPv4 packet using the IPv4 address of the DSTM host 100 obtained from the received DNS reply message (S220).

Upon receipt of the IPv4 packet, the DSTM TEP 300 sends to the DSTM server 400 a DSTM binding request message to request mapping information containing IPv6 address information corresponding to the destination address of the IPv4 packet (S230).

The IPv4 packet received by the DSTM TEP 300 may correspond to a packet of the RSVP message for establishing the session according to the tunnel RSVP mechanism. That is, the IPv4 packet may correspond to the RSVP reservation message for establishing the session between the DSTM host 100 and the IPv4 host 200.

When the DSTM server 400 receives the DSTM binding request message from the DSTM TEP 300, the DSTM server 400 retrieves mapping information for IPv4 address as the destination address of the IP packet from the mapping table 430.

The DSTM server 400 sends a DSTM binding update message to the DSTM TEP 300. The DSTM binding update message contains the retrieved mapping information from the mapping table 430, such as the IPv6 address mapped to the IPv4 address, the lifetime information of the IPv4 address and the like, and the RSVP support information of the DSTM host 100 (S240).

The DSTM server 400 includes the RSVP support information of the DSTM host 100 into the (1-bit) RSVP field of the DSTM binding update message based on the DSTM message format as shown in FIG. 8 and transmits the resultant message to the DSTM TEP 300.

In other words, the DSTM server 400 includes the RSVP support information obtained from the DSTM address allocation acknowledgement message, which is received from the DSTM host 100, into the DSTM binding update message and transmits the resultant message to the DSTM TEP 300, so that the DSTM TEP 300 as the starting node of the tunnel section confirms the RSVP support information of the DSTM host as the last node of the tunnel.

When the DSTM TEP 300 receives the DSTM binding update message from the DSTM server 400, the DSTM TEP 300 stores the IPv4 address and the IPv6 address of the DSTM host 100 and the lifetime information of the IPv4 address into its mapping table and sets the lifetime information to a timer.

Using the stored mapping information, the DSTM TEP 300 performs IPv4-over-IPv6 tunneling from the IPv4 host 200 to the DSTM host 100 on the IPv4 packet (S250).

When the DSTM host 100 receives the packet tunneled from the DSTM TEP 300, the DSTM host 100 decapsulates the packet to obtain an original IPv4 packet transmitted by the IPv4 host 200.

The DSTM host 100 performs IPv4-over-IPv6 tunneling to the DSTM TEP 300 on the IPv4 packet using the allocated IPv4 address information and the IPv6 address information of the DSTM TEP 300 obtained from the DSTM address allocation message, which is received from the DSTM server 400 (S260). The DSTM TEP 300 decapsulates the received IPv4 packet from the DSTM host 100 and transmits the decapsulated packet to the IPv4 network (S270).

If the timer set in each entry of the mapping table 430 expires, i.e., the lifetime of the IPv4 address allocated to the DSTM host 100 expires, the DSTM manager 420 deletes the entry from the mapping table 430. The DSTM manager 420 also requests to delete the IPv4 address information of the DSTM host 100 registered upon IPv4 address allocation from the IPv6 DNS server 520, and withdraws the IPv4 address allocated to the DSTM host 100.

To continue to use the allocated IPv4 address after the lifetime expires, the DSTM host 100 sends a DSTM address extension request message to the DSTM server 400 prior to expiration of the lifetime to extend the lifetime of the allocated IPv4 address.

When the DSTM server 400 receives the DSTM address extension message from the DSTM host 100, it retrieves a relevant entry from the mapping table 430 to extend the lifetime and reset a relevant timer.

The DSTM server 400 also sends a DSTM address extension reply message to the DSTM host 100. The DSTM TEP 300 deletes the entry from its mapping table when mapping information is not used until the timer set to the entry of the mapping table expires.

If the mapping information is used prior to timer expiration, the DSTM TEP 300 transmits a DSTM binding request message to the DSTM server 400 prior to timer expiration to update the mapping information and reset the timer.

FIG. 9 is a flow diagram illustrating an RSVP mechanism according to an exemplary embodiment of the present invention.

Referring to FIG. 9, DSTM host 100 as a transmitting endpoint (source/first host) supports a tunnel RSVP mechanism, a starting node of a tunnel session is DSTM TEP 300 and a last node of the tunnel session is DSTM host 100.

Upon receipt of a DSTM address allocation message containing the IPv4 address allocated according to a DSTM and the IPv6 address of the DSTM TEP 300 from DSTM server 400, the DSTM host 100 sends a DSTM address allocation acknowledgement message containing RSVP support information to the DSTM server 400 to notify the DSTM server 400 whether the DSTM host 100 supports the RSVP or not.

When the DSTM server 400 receives a DSTM binding request message requiring mapping information mapped to destination address information of an IPv4 packet received from the DSTM TEP 300, the DSTM server 400 sends a DSTM binding update message containing the mapping information mapped to the destination address information and the RSVP support information of the DSTM host 100 to the DSTM TEP 300 so that the DSTM TEP 300 confirms whether the DSTM host 100 supports the RSVP or not.

The DSTM host 100 encapsulates an end-to-end (EtoE) path message for establishing an end-to-end session for packet transmission and a tunnel path message for establishing a tunnel session according to the RSVP mechanism and transmits the resultant message to the DSTM TEP 300 (S300).

The DSTM TEP 300 stores the end-to-end session information and the tunnel session information and decapsulates the end-to-end path message to send the message to the IPv4 host 200 (client/second host) as the receiving endpoint (S310).

Upon receipt of the end-to-end path message, the IPv4 host 200 sends an end-to-end reservation (Resv) message to the DSTM TEP 300 to request reservation of resources on the end-to-end path (S320).

Since the DSTM TEP 300 has confirmed the RSVP support information of the DSTM host 100, which is the last node of the tunnel, from the DSTM binding update message received from the DSTM server 400, the DSTM TEP 300 transmits the tunnel Resv message while encapsulating the end-to-end Resv message and transmitting the encapsulated message to the DSTM host 100 (S330).

The DSTM TEP 300 stores mapping information for the end-to-end session and the tunnel session.

That is, since the DSTM TEP 300 has confirmed the RSVP support information of the DSTM host 100 that is the last node of the tunnel session, the last node of an existing tunnel session includes RSVP support information into a tunnel path message for establishing a tunnel session path to send it to the starting node if the DSTM host 100 supports the RSVP. The starting node confirms the RSVP support information of the last node and then is able to establish the tunnel session and the end-to-end session at the same time without transmitting the tunnel Resv message.

As described above, according to the present invention, it is possible to simultaneously establish an end-to-end session and a tunnel session by notifying a starting node of the tunnel session in advance about whether a last node supports RSVP while assigning IPv4 address information to an IPv6 host according to DSTM upon reserving a resource according to an RSVP mechanism in a 4over6 DSTM environment.

While the present invention has been described with reference to exemplary embodiments thereof, it will be understood by those skilled in the art that various changes in form and detail may be made therein without departing from the scope of the present invention as defined by the following claims.

What is claimed is:

1. An IPv4/IPv6 combination network system, the system comprising:

a dual stack transition mechanism (DSTM) server configured to recognize whether each host connected to an IPv6 network supports a resource reservation protocol (RSVP) while allocating IPv4 address information to the hosts according to a DSTM, and to notify a node exchanging packets according to the RSVP that the each host supports the RSVP in response to receipt of a request from the node, wherein the node is configured to determine, through the DSTM server, whether a receiving host supports the RSVP, in response to receipt of a reservation message according to the RSVP from a transmitting host, and to simultaneously establish an end-to-end session with the receiving host and a tunnel session with the transmitting host mapped to the end-to-end session in response to a determination that the receiving host supports the RSVP.

2. An IPv4/IPv6 combination network system to reserve a path resource according to a resource reservation protocol (RSVP) mechanism, the system comprising:

a first host connected to an IPv6 network, the first host configured to transmit a path message according to the RSVP mechanism to a second host connected to an IPv4 network in response to a determination that the first host is to transmit a first packet to the IPv4 network;

the second host configured to transmit a reservation message according to the RSVP mechanism to a node located between the IPv6 network and the IPv4 network in response to receipt of the path message from the first host; and a dual stack transition mechanism (DSTM) server configured to recognize RSVP support information of the first host connected to the IPv6 network while allocating IPv4 address information to the first host according to a DSTM, and to provide the RSVP support information of the first host to the node in response to a request message from the node, wherein the node is configured to recognize the RSVP support information of the first host from the DSTM server in response to receipt of the reservation message from the second host, and to simultaneously establish an end-to-end session with the second host and a tunnel session with the first host mapped to the end-to-end session according to the RSVP support information of the first host.

3. The system of claim 2, wherein the node is configured to simultaneously transmit a tunnel reservation message for establishing the tunnel session with the first host according to the RSVP support information of the first host and an encapsulated reservation message to the first host in response to receipt by the node of the reservation message from the second host.

4. The system of claim 2, wherein the node is configured to manage information on the end-to-end session established with the second host and information on the tunnel session with the first host mapped to the end-to-end session information, and to transmit a second packet to the first host via the tunnel session mapped to the end-to-end session into which the second packet enters from the second host.

5. The system of claim 2, wherein the request message comprises a binding request message for requesting IPv4 address information corresponding to destination information of a second packet in response to receipt by the node of the second packet from the second host.

6. The system of claim 2, wherein the first packet comprises an RSVP message for establishing a packet exchange session according to the RSVP mechanism.

7. An apparatus to reserve a session resource according to an RSVP (resource reservation protocol) mechanism in an IPv4/IPv6 combination network system, the apparatus comprising:

a DSTM (dual stack transition mechanism) server configured to transmit an allocation message for allocating IPv4 address information to a first host connected to an IPv6 network according to a DSTM, to obtain RSVP support information from a received allocation reply message, and to provide an update message comprising mapping information of the IPv4 address information and the RSVP support information to a node in response to receipt of a request message for requesting the mapping information of the IPv4 address information from the node, wherein the first host is configured to transmit the allocation reply message comprising the RSVP support information to the DSTM server in response to receipt of the allocation message from the DSTM server, and to transmit a first packet to a second host connected to an IPv4 network using the IPv4 address information allocated through the allocation message;

wherein the second host is configured to transmit a second packet to the first host using the IPv4 address information allocated to the first host by the DSTM server; and wherein the node is configured to transmit the request message to the DSTM server to request mapping information corresponding to destination address information of the second packet that is received from the second host, to establish a session according to the RSVP support information of the first host included in the update message from the DSTM server, and to transmit the second packet to the first host according to the mapping information corresponding to the destination address information.

8. The apparatus of claim 7, further comprising:

a first domain name system (DNS) server configured to transmit a query message of a first type for querying the IPv4 address information of the first host from the second host to the DSTM server, and to provide the IPv4 address information of the first host to the second host; and a second DNS server configured to provide a reply message comprising the IPv4 address information and IPv6 address information of the first host in response to a query message of a second type from the DSTM server.

9. The apparatus of claim 8, wherein the DSTM server comprises:

a DNS gateway configured to translate the query message of the first type from the first DNS server into the query message of the second type, to transmit the query message of the second type to the second DNS server, to translate the reply message of the second type from the second DNS server into a reply message of the first type, and to transmit the reply message of the first type to the first DNS server;

a DSTM manager configured to allocate the IPv4 address information to the first host, to register the IPv4 address information in the second DNS server, and to transmit an allocation message comprising the IPv4 address information to the first host; and a mapping table configured to store the mapping information of the IPv4 address information.

10. The apparatus of claim 9, wherein the DSTM manager is configured to recognize the RSVP support information contained in the received allocation reply message from the first host and to transmit the update message to the node, the update message comprising the mapping information corresponding to the destination address information in the received request message from the node and the RSVP support information of the first host.

11. The apparatus of claim 9, wherein the mapping information of the IPv4 address information comprises at least one of IPv6 address information of the first host, the allocated IPv4 address information, and lifetime information of the allocated IPv4 address information.

12. The apparatus of claim 7, wherein reserved field of an IPv6 header in each message is set as an RSVP field indicating the RSVP support information.

13. A method to reserve a session resource according to an RSVP (resource reservation protocol) mechanism in an IPv4/IPv6 combination network comprising a first host, a second host a DSTM (dual stack transition mechanism) server and a node, the method comprising:

recognizing, by the DSTM server, RSVP support information of the first host and transmitting an update message comprising the RSVP support information to the node in response to receipt of a request message from the node;

transmitting, by the first host, an RSVP dependent path message to the second host;

transmitting, by the second host, an RSVP dependent reservation message to the node upon receipt of the RSVP dependent path message; and simultaneously transmitting, by the node, to the first host a reservation message for establishing an end-to-end session with the second host and a tunnel reservation message for establishing a tunnel session with the first host according to the RSVP support information of the first host recognized from the update message.

14. The method of claim 13, further comprising:

decapsulating, by the node, an encapsulated path message received from the first host and transmitting the decapsulated path message to the second host;

encapsulating the RSVP dependent reservation message received from the second host and simultaneously transmitting to the first host the tunnel reservation message for establishing the tunnel session with the first host and the encapsulated reservation message; and managing end-to-end session information established with the second host and tunnel session information with the first host mapped to the end-to-end session information.

15. The method of claim 13, further comprising:

managing, by the DSTM server, IPv4 address information allocated to the first host and mapping information of the first host;

transmitting, by the first host, a first packet using the IPv4 address information allocated to the first host;

transmitting, by the second host, a second packet using the IPv4 address information allocated to the first host;

transmitting, by the node, a request message to the DSTM server to request mapping information corresponding to destination address information of the second packet that is received from the second host; and transmitting, by the DSTM server, to the second host the update message comprising the mapping information corresponding to the destination address information and the RSVP support information of the first host upon receipt of the request message.

16. A method of reserving a session resource according to an RSVP (resource reservation protocol) mechanism in an IPv4/IPv6 combination network comprising a first host, a second host, a DSTM (dual stack transition mechanism) server and a node, the method comprising:

allocating, by the DSTM server, IPv4 address information to the first host connected to an IPv6 network and recognizing RSVP support information of the first host;

transmitting, by the node, a request message to the DSTM server to request mapping information corresponding to destination address information of a packet upon receipt of the packet from a second host;

transmitting, by the DSTM server, an update message to the node, the update message comprising mapping information responsive to the request message and the RSVP support information of the first host; and simultaneously establishing, by the node, an end-to-end session with the second host and a tunnel session with the first host according to the RSVP support information of the first host recognized from the update message.

17. The method of claim 16, wherein the packet received from the second host comprises a reservation message for establishing a session according to the RSVP mechanism.

18. The method of claim 16, wherein recognizing the RSVP support information of the first host comprises:

transmitting an allocation message to the first host, the allocation message comprising the allocated IPv4 address information and IPv6 address information of the node;

recognizing, by the first host, each address information from the allocation message and transmitting a reply message comprising the RSVP support information to the DSTM server; and recognizing, by the DSTM server, the RSVP support information of the first host included in the reply message.

19. The method of claim 16, further comprising:

managing, by the DSTM server, mapping information of the first host in a table; and retrieving, by the DSTM server, the mapping information of the first host that is managed in the table and transmitting to the node the update message comprising the mapping information of the first host and the RSVP support information in response to receipt of the request message from the node.

20. The method of claim 16, further comprising simultaneously transmitting, by the node, to the first host a tunnel reservation message for establishing the tunnel session and an end-to-end reservation message for establishing the end-to-end session according to the RSVP support information of the first host in response to receipt by the node of an RSVP dependent reservation message from the second host.

* * * * *